(12) United States Patent
Shimomura

(10) Patent No.: US 7,190,253 B2
(45) Date of Patent: Mar. 13, 2007

(54) DOOR CONTROL SYSTEM AND METHOD FOR VEHICLES

(75) Inventor: Toshio Shimomura, Chiryu (JP)

(73) Assignee: Denso Corporation, Kariya (JP)

( * ) Notice: Subject to any disclaimer, the term of this patent is extended or adjusted under 35 U.S.C. 154(b) by 315 days.

(21) Appl. No.: 10/279,995

(22) Filed: Oct. 25, 2002

(65) Prior Publication Data

US 2003/0095040 A1    May 22, 2003

(30) Foreign Application Priority Data

Nov. 19, 2001    (JP)    ............................. 2001-353472

(51) Int. Cl.
*H04Q 9/00*    (2006.01)
*G08C 19/00*    (2006.01)
*B60R 25/10*    (2006.01)

(52) U.S. Cl. ...................... 340/5.3; 340/5.61; 340/5.72; 340/825.72; 340/825.31; 340/5.62; 340/426.17

(58) Field of Classification Search ................. 340/5.3, 340/5.61, 5.72, 825.72, 825.31, 825.3, 5.62, 340/426.16, 426.17, 426.26, 539
See application file for complete search history.

(56) References Cited

U.S. PATENT DOCUMENTS

| | | | |
|---|---|---|---|
| 3,846,778 A | | 11/1974 | Galvin et al. |
| 5,216,406 A | * | 6/1993 | Bechtle .................. 340/426.28 |
| 5,793,309 A | * | 8/1998 | Nellson .................... 340/932.2 |
| 5,929,753 A | * | 7/1999 | Montague .............. 340/426.19 |
| 5,973,611 A | * | 10/1999 | Kulha et al. ................ 340/5.62 |
| 6,075,454 A | * | 6/2000 | Yamasaki ................... 340/5.61 |
| 6,552,649 B1 | * | 4/2003 | Okada et al. .............. 340/5.61 |
| 6,583,715 B1 | * | 6/2003 | Benzie et al. .............. 340/5.64 |
| 6,946,949 B2 | * | 9/2005 | Heide et al. ................ 340/5.61 |

FOREIGN PATENT DOCUMENTS

| | | |
|---|---|---|
| JP | A-07-047928 | 2/1995 |
| JP | A-10-153025 | 6/1998 |

OTHER PUBLICATIONS

Lexus, New Car Features, LS430 UCF30 Series, Aug. 2000.

* cited by examiner

*Primary Examiner*—Jeffery Hofsass
*Assistant Examiner*—Scott Au
(74) *Attorney, Agent, or Firm*—Posz Law Group, PLC

(57) ABSTRACT

A door control system for vehicles has a transmitter and a receiver for detecting an electronic key in a first predetermined area around a vehicle. A control unit controls unlocking of a vehicle door by determining whether the detected electronic key is an authorized one. The door control system also has an object sensor for detecting an object entering into a second predetermined area covering and wider than the first predetermined area. The control unit activates the transmitter and the receiver only after the object sensor detects the object in the second predetermined area, thereby reducing power consumption.

9 Claims, 2 Drawing Sheets

DOOR CONTROL SYSTEM AND METHOD FOR VEHICLES

CROSS REFERENCE TO RELATED APPLICATION

This application is based on and incorporates herein by reference Japanese Patent Application No. 2001-353472 filed on Nov. 19, 2001.

FIELD OF THE INVENTION

The present invention relates to a door control system and method for vehicles, which automatically drives locked vehicle doors to unlocked condition or to unlock standby condition through radio communication with an electronic key carried by a vehicle driver.

BACKGROUND OF THE INVENTION

As keyless entry systems for vehicles, which automatically unlock vehicle doors without mechanical key operation, a smart entry system is proposed. In one smart entry system, a radio communication device (radio transmitter/receiver) mounted in a vehicle starts its communications with an electronic key carried by a vehicle driver only after the vehicle driver manipulates a door from the exterior side. This system drives the doors to the unlock standby condition, when the electronic key is confirmed as the authorized one. However, this system takes some time to enable the vehicle driver to open the door after he touches it.

In another smart entry system, a radio device mounted in a vehicle performs data communications with an electronic key carried by a vehicle driver, when the driver approaches the vehicle. The device then unlocks the doors or drives the doors to the unlock standby condition, if the electronic key is confirmed as the authorized one. In this system, the radio device must continuously or periodically generate radio signals for communications with the electronic key while the vehicle is held parked, because it is impossible to estimate when the vehicle driver having the electronic key returns to the vehicle. Further, this device must be mounted in each door in the vehicle, so that the generated radio signal may be received by the electronic key whichever directions the vehicle driver is. This system thus consumes too much electric power of a storage battery of the vehicle.

SUMMARY OF THE INVENTION

It is therefore an object of the present invention to provide a door control system and method for vehicles, which consumes less electric power for communications with an electronic key.

According to the present invention, a door control system for vehicles has a transmitter and a receiver for detecting an electronic key in a first predetermined area around a vehicle. A control unit controls unlocking of a vehicle door by determining whether the detected electronic key is an authorized one. The door control system also has an object sensor for detecting an object entering into a second predetermined area covering and wider than the first predetermined area. The control unit activates the transmitter and the receiver only after the object sensor detects the object in the second predetermined area, thereby reducing power consumption.

Preferably, the door control system has an intruder sensor for detecting an intruder, and the control unit activates the intruder sensor only after determining that the electronic key is an unauthorized one.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
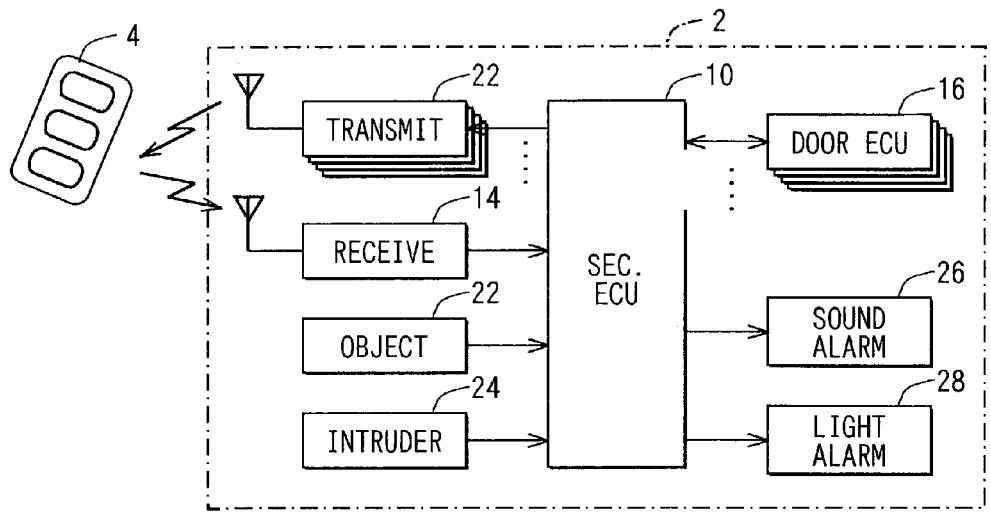
FIG. 1 is a block diagram showing a smart entry system constructed as a door control system according to an embodiment of the present invention.

Referring first to FIG. 1, a door control system for vehicles is constructed, as a smart entry system, with a door unlocking device 2 mounted on a vehicle and an electronic key 4. The key 4 is a portable radio device carried by a vehicle driver (owner) for data communications with the device 2. The key 4 is activated by an interrogation signal transmitted from the device 2, and transmits in return its identification code (ID code) as a response signal. The ID code differs from key to key. The device 2 is primarily constructed with a security ECU (electronic control unit) 10, which monitors surrounding conditions of the vehicle, when the vehicle is held parked with its all doors being locked.

Figure 2:
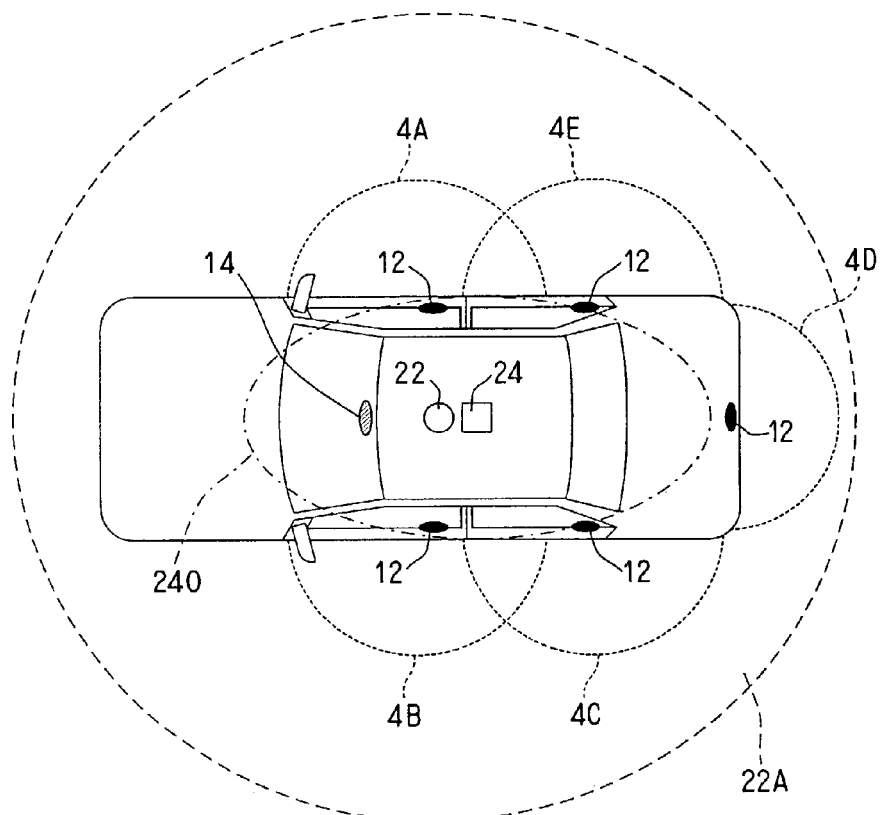
FIG. 2 is a schematic diagram showing areas of detection of an object and an electronic key by a security ECU used in the embodiment of FIG. 1.

In the device 2, the ECU 10 is connected to at least one radio transmitter 12 (five transmitters in FIG. 1) for transmitting the interrogation signals for the key 4, a radio receiver 14 for receiving the response signal from the key 4, and door ECUs 16 for controlling locking and unlocking of vehicle doors. As shown in FIG. 2, the transmitters 12 are installed in the driver-side door, the front passenger-side door, the rear passenger-side doors and the rear luggage door, respectively. The transmitters 12 transmit the interrogation signals, so that the key 4 may be activated when the vehicle driver enters predetermined first areas 4A–4E of the transmitters 12. These areas 4A–4E are variable with the power levels of the interrogation signals, respectively.

The key 4 responsively transmits the response signal including its specific ID code. The receiver 14 is installed in a rear view mirror above a driver's seat to receive the response signal from the key 4 and decode the ID code included in the received response signal. For radio signal communications between the device 2 and the key 4, electromagnetic waves in the frequency band from kHz to MHz are used so that the radio signals may be transmitted and received without being interrupted by humans.

The security ECU 10 determines whether the key 4 is the authorized one based on the ID code decoded by the receiver 14, and applies an instruction signal to the door ECUs 16 for performing door unlocking operation or unlock standby operation when the key 4 is confirmed as the authorized one, that is, the key 4 has the ID code specifically assigned to the vehicle. If the driver leaves the vehicle out of the areas 4A–4E, the receiver 14 does not receive the response signal. As a result, the ECU 10 applies an instruction signal to the ECUs 16 so that the ECUs 16 perform door locking operation. Although not described in detail, the door unlocking operation, unlock standby operation and locking operation vary from vehicle to vehicle. The ECUs 16 are connected to various door sensors (not shown) to receive respective door open/close detection signals for use in controlling various door locking/unlocking operations.

The ECU 10 is also connected to those door sensors to receive the door open/close signals. The ECU 10 is further connected to an object sensor 22, an intrusion sensor 24, a sound alarm 26 and a light alarm 28.

The object sensor 22 is for detecting any objects approaching the vehicle. Specifically, the object sensor 22 generates an electromagnetic wave signal of about several GHz. If the sensor 22 receives reflection of this signal, the sensor 22 determines that an object such as a human is approaching to the vehicle. The output power of the electromagnetic wave signal is determined to be able to detect the object in a predetermined second area 22A (FIG. 2), which covers a nearby area including the vehicle and the areas 4A–4E.

The intruder sensor 24 is for detecting an intruder intruding into the vehicle. Specifically, the intruder sensor 24 transmits and receives an ultrasonic wave signal in the vehicle interior. It detects an intruder, when the received signal varies from the normal one.

The sound alarm 26 is for activating a siren or the like. The light alarm 28 is for activating an interior light or hazard lights. Those alarms 26 and 28 are operable with a built-in battery to provide an alarm or warning even when a normal power supply in the vehicle is shut off.

Figure 3:
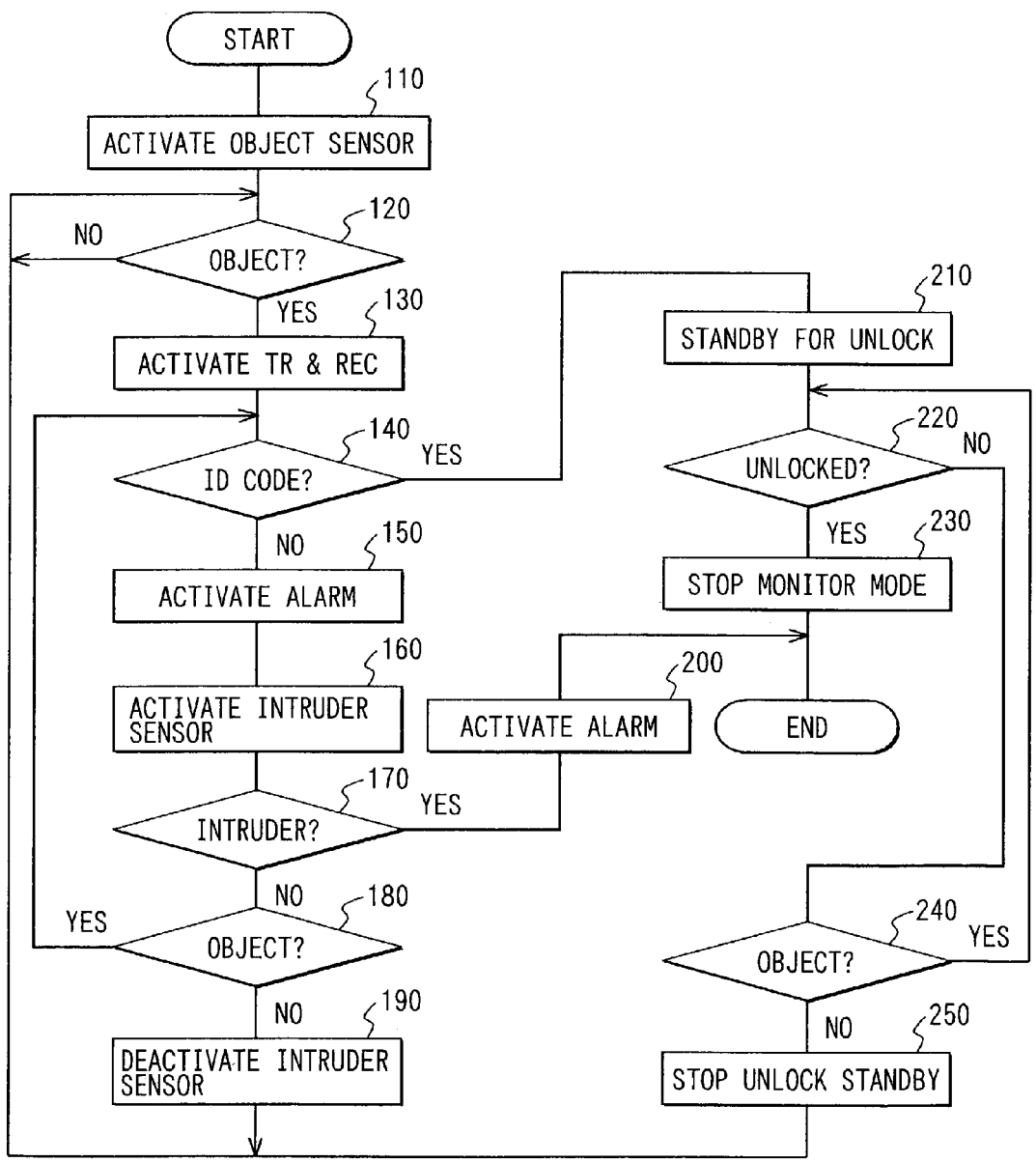
FIG. 3 is a flow diagram showing control processing executed by the security ECU in the embodiment of FIG. 1.

In this embodiment, the security ECU 10 is programmed to execute the monitoring operation and door unlocking control as shown in FIG. 3. The ECU 10 starts this processing, when the vehicle is parked with its all doors being locked.

The ECU 10 first activates the object sensor 22 at step 110 by supplying electric power, and determines at step 120 whether any object in the area 22A is detected by the sensor 22. If the object is detected (YES), the ECU 10 also activates the transmitters 12 and the receiver 14 at step 130. The ECU 10 then determines at step 140 whether the authorized electronic key 4 having the right ID code in the area 4A, 4B, 4C, 4D or 4E is detected by the receiver 14. If no authorized key is detected (NO), the ECU 10 activates the alarms 26 and 28 at step 150. This alarm is a notice or precaution indicating a monitored condition to such an unauthorized person, and hence should be limited to a short and/or low output level so that the buzzing and lighting will not disturb nearby persons and neighbors.

The ECU 10 then activates the intruder sensor 24 at step 160, and determines at step 170 whether an intruder is detected by the intruder sensor 24. In addition to or in place of the intruder sensor 24, an intruder may be detected by the door sensors and the like when a locked door is forcibly unlocked or opened. If an intruder is thus detected (YES), the ECU 10 activates the alarms 26 and 28 at step 200. In this case the alarms 26 and 28 provides buzzing and lighting in high output levels for a long time, respectively, so that the intrusion is notified to even neighbors. These alarms 26 and 28 are kept activated until deactivated in an authorized manner.

If no intruder is detected at step 170 (NO), the ECU 10 determines again at step 180 whether any object is detected by the object sensor 22. If the object is detected (YES), the ECU 10 repeats the above key checking processing starting from step 140. If no object is detected (NO), the ECU 10 determines that the object detected by the object sensor 22 was just a passerby. The ECU 10 therefore deactivates the transmitters 12, receiver 14 and intruder sensor 24 at step 190, and repeats the object detecting processing from step 120.

In case that the key 4 is determined to be an authorized one (YES) by checking its ID code at step 140, that is, when the vehicle driver came close to the vehicle, the ECU 10 applies the instruction signal to the door ECUs 16 at step 210 so that the doors are automatically unlocked or held in the unlock standby condition. In the unlock standby condition, the ECU 16 unlocks the corresponding door only when an unlocking switch mounted on the outside of such a door is manipulated by the vehicle driver. The ECU 210 also deactivates the object sensor 22, transmitters 12 and receiver 14 at step 210.

The ECU 10 determines at step 220 whether the door is unlocked. If it is unlocked (YES), that is, if the door is opened by the vehicle driver and hence it is not necessary to perform the monitoring operation, the ECU 10 deactivates at step 230 the object sensor 22 as well as the transmitters 12 and the receiver 14. The intruder sensor 24 is also deactivated, if it is in operation.

If the doors are not unlocked (NO) by the door ECUs 16, the ECU 10 determines at step 240 whether any object is detected by the object sensor 22. If the object is detected (YES), the ECU 10 repeats the unlocking detection processing from step 220. If the object is not detected any more (NO), that is, if the driver approaching the vehicle leaves the vehicle before unlocking the door, the ECU 10 stops applying the unlock standby instruction signal to the door ECUs 16. After step 250, the ECU 10 repeats the object detecting operation from step 120.

According to this embodiment, the transmitters 12 and receiver 14 are activated only when the object is detected as approaching the vehicle by the object sensor 22 after the vehicle is parked, power consumption by the transmitters 12 and receiver 14 can be reduced although the object sensor 22 need be held operating. Specifically, power consumption can be reduced, because current of about milliamperes flows in the object sensor 22 while current of about tens of milliamperes flows in the transmitters 12 and receiver 14.

Further, although the intruder sensor 24 is used to detect an intruder, it is not kept activated during parking of a vehicle but activated only after the detected key (object) is determined to be an unauthorized one (person). Therefore, power consumption of the intruder sensor 24 can be reduced as well.

The present invention should not be limited to the disclosed embodiment but may be implemented in many other ways without departing from the spirit of the invention.

What is claimed is:

1. A door control system for vehicles comprising:
   a transmitter for transmitting an interrogation signal in a first predetermined area of a vehicle door;
   a receiver for receiving a response signal generated from an electronic key of a vehicle in response to the interrogation signal;
   a control unit for controlling unlocking of the vehicle door by determining whether the electronic key is an authorized one in response to the response signal; and
   an object sensor for detecting an object entering into a second predetermined area covering and wider than the first predetermined area by transmitting a signal and receiving a reflection of the signal when the signal is reflected by the object,
   wherein the control unit activates the transmitter and the receiver only after the object sensor detects the object in the second predetermined area.

2. The door control system as in claim 1, wherein the control unit deactivates the transmitter, the receiver and the object sensor, when the door is unlocked.

3. The door control system as in claim 1, the transmitter is mounted in each door of the vehicle.

4. The door control system as in claim 1, wherein the control unit activates the object sensor after the vehicle is parked.

5. The door control system as in claim 1, wherein the object sensor consumes less power than does the transmitter and the receiver.

6. The door control system as in claim 1, wherein the object sensor comprises a sensor that generates an electromagnetic sensor wave having a wavelength on the order of several gigahertz.

7. The door control system as in claim 6, wherein the object sensor consumes less power than does the transmitter and the receiver.

8. A vehicle door control system comprising:
   a transmitter for transmitting an interrogation signal in a first predetermined area of a vehicle door;
   a receiver for receiving a response signal generated from an electronic key of a vehicle in response to the interrogation signal;
   a control unit for controlling unlocking of the vehicle door by determining whether the electronic key is an authorized one in response to the response signal; and
   an object sensor for detecting an object entering into a second predetermined area covering and wider than the first predetermined area; and
   an intruder sensor for detecting an intruder, wherein
   the control unit activates the intruder sensor only after determining that the electronic key is an unauthorized one, and activates the transmitter and the receiver only after the object sensor detects the object in the second predetermined area, and
   the control unit deactivates the intruder sensor when the object sensor detects no object in the second predetermined area.

9. A door control system for vehicles comprising:
   a transmitter for transmitting an interrogation signal in a first predetermined area of a vehicle door;
   a receiver for receiving a response signal generated from an electronic key of a vehicle in response to the interrogation signal;
   a control unit for controlling unlocking of the vehicle door by determining whether the electronic key is an authorized one in response to the response signal;
   an object sensor for detecting an object entering into a second predetermined area covering and wider than the first predetermined area;
   an intruder sensor for detecting an intruder; and
   an alarm, wherein
   the control unit activates the intruder sensor only after determining that the electronic key is an authorized one, and activates the alarm when the object sensor detects the object but the object has an unauthorized key, and when the intruder sensor detects the intruder, and
   the control unit activates the alarm with a lower output power when the object sensor detects the object having the unauthorized key than when the intruder sensor detects the intruder.

* * * * *